United States Patent
Baldwin et al.

(10) Patent No.: US 8,949,956 B1
(45) Date of Patent: Feb. 3, 2015

(54) MULTI-ACCOUNT MESSAGING MANAGEMENT

(75) Inventors: Peter G. Baldwin, Waterloo (CA);
Derek J. Phillips, Waterloo (CA); Jen Chen-Chuan Hsieh, Brampton (CA);
Neil Richard Thomas, Richmond (CA)

(73) Assignee: Google Inc., Mountain View, CA (US)

( * ) Notice: Subject to any disclaimer, the term of this patent is extended or adjusted under 35 U.S.C. 154(b) by 1052 days.

(21) Appl. No.: 12/510,953

(22) Filed: Jul. 28, 2009

Related U.S. Application Data

(60) Provisional application No. 61/084,215, filed on Jul. 28, 2008.

(51) Int. Cl.
*G06F 17/30* (2006.01)

(52) U.S. Cl.
USPC ............ 726/6; 726/29; 713/153; 715/743; 715/752; 709/206; 709/217

(58) Field of Classification Search
CPC ......... H04L 51/22; H04L 51/24; H04L 51/18; H04L 63/0823; H04L 63/0807; H04L 63/0815; H04L 12/582; H04L 12/584; H04L 12/5855; H04L 12/587; G06F 21/36; G06F 3/0482; G06F 3/04817; G06Q 10/107
USPC .............. 726/6, 28; 713/153; 715/752, 743; 709/206, 217
See application file for complete search history.

(56) References Cited

U.S. PATENT DOCUMENTS

| | | | | |
|---|---|---|---|---|
| 5,488,359 A | * | 1/1996 | Faris et al. | 340/7.52 |
| 7,185,059 B2 | * | 2/2007 | Daniell et al. | 709/206 |
| 8,126,895 B2 | * | 2/2012 | Sargent et al. | 707/741 |
| 8,150,930 B2 | * | 4/2012 | Satterfield et al. | 709/206 |

(Continued)

FOREIGN PATENT DOCUMENTS

| | | | | |
|---|---|---|---|---|
| EP | 1 775 924 A1 | * | 10/2005 | H04M 1/725 |
| EP | 1775924 A1 | * | 10/2005 | H04M 1/725 |

OTHER PUBLICATIONS

"Microsoft Outlook 2003: Configuring Multiple Accounts?" [online] [retrieved on Aug. 26, 2010] Retrieved from the internet: http://web.archive.org/web/20050924022335/http://askdavetaylor.com/microsoft_outlook_2003_configuring_multiple_accounts.html (2003) 6 pages.

(Continued)

*Primary Examiner* — Eleni Shiferaw
*Assistant Examiner* — Paul Callahan
(74) *Attorney, Agent, or Firm* — Fish & Richardson P.C.

(57) ABSTRACT

A system and a computer-implemented methods for email management are disclosed. The method includes storing messages for electronic mail accounts provided by remote electronic mail server systems. The method further includes determining that the remote electronic mail server systems each have a different hostname than the others of the remote electronic mail server systems. The method further includes displaying messages from a first one of the electronic mail accounts and displaying a hostname of a first remote electronic mail server system providing the first one of the electronic mail accounts. The method further includes receiving a request to view messages from a second one of the electronic mail accounts. The method further includes displaying messages from the second one of the electronic mail accounts and displaying a hostname of a second remote electronic mail server system providing the second one of the electronic mail accounts.

18 Claims, 6 Drawing Sheets

(56) References Cited

U.S. PATENT DOCUMENTS

| | | | | |
|---|---|---|---|---|
| 2001/0044827 | A1* | 11/2001 | Zhuk | 709/205 |
| 2002/0138582 | A1* | 9/2002 | Chandra et al. | 709/206 |
| 2005/0193351 | A1* | 9/2005 | Huoviala | 715/815 |
| 2006/0009243 | A1* | 1/2006 | Dahan et al. | 455/466 |
| 2007/0282957 | A1* | 12/2007 | Van Belle et al. | 709/206 |
| 2010/0217780 | A1* | 8/2010 | Erola et al. | 707/802 |
| 2011/0113375 | A1* | 5/2011 | Moody et al. | 715/825 |

OTHER PUBLICATIONS

"How Do I Create Multiple Accounts in Mozilla Thunderbird?" [online] [retrieved on Aug. 26, 2010] Retrieved from the internet: http://web.archive.org/web/20051228030137/http://www.askdavetaylor.com/how_do_i_create_multiple_accounts_in_mozilla_thunderbird.html (2002) 3 pages.

"Apple iPhone Call Phone Review—Messaging" [online] [retrieved on Aug. 26, 2010] Retrieved from the internet: http://web.archive.org/web/2007811005513/http://www.wirelessinfo.com/content/Apple-iPhone-Cell-Phone-Review/Messaging.htm (Jun. 29, 2007) 5 pages.

"Using Pidgin—Pidgin—Trac" [online] [retrieved on Aug. 26, 2010] Retrieved from the internet: http://web.archive.org/web/20070709122820/http://developer.pidgin.im/wiki/Using+Pidgin (2007) 6 pages.

* cited by examiner

MULTI-ACCOUNT MESSAGING MANAGEMENT

CROSS-REFERENCE TO RELATED APPLICATIONS

This application claims priority to U.S. Application Ser. No. 61/084,215, filed on Jul. 28, 2008, and entitled, "Multi-Account Messaging Management."

BACKGROUND

This specification relates to managing multiple messaging accounts using a mobile computing device.

More and more, people spend their time interacting with electronic devices—whether in the form of desktop computers, set-top television boxes, mobile devices such as smartphones, or other such devices. People like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, four-directional keypads, and other such input mechanisms.

Fine distinctions in user interfaces can make a world of difference in a user's experience with a device. User interface options may be reduced for mobile devices, where full sized display screens are not available. In such situations, intuitive interaction may be at a premium. The importance of such interaction may be even more pronounced with mobile devices, where there exists a limited amount of application memory.

SUMMARY

In general, this document describes managing multiple messaging accounts using a mobile computing device. The accounts may be made available to a user of a device so that only one account is presented at a time, but a user can switch quickly between and among accounts within a single instantiation of an electronic mail application (which may provide for various modes of communication, including electronic mails, text messages, voice mail messages and the like). A menu may be displayed to a user showing each account to which they are currently registered, they may select an account that they are not currently viewing, and the application may immediately switch them to viewing messages for the selected account. Certain representations of the messages may be stored in volatile memory even when the user is not viewing a particular account, so as to permit immediate switch-over to another account. Also, the application may store authentication data (e.g., ID and password, or an email address and an authentication token) for each account, may automatically sign on to the accounts to synchronize a client device with an electronic mail server, and may perform such synchronization in the background while a user is viewing messages from another account.

In a first aspect, a computer-implemented electronic mail management method includes storing, on a client computing device, messages for a plurality of electronic mail accounts provided by a plurality of remote electronic mail server systems. Messages for each account are stored separately from messages for others of the plurality of electronic mail accounts. The method further includes determining that the remote electronic mail server systems each have a different hostname than the others of the remote electronic mail server systems. The method further includes displaying, within an instantiation of an electronic mail application, messages from a first one of the electronic mail accounts without simultaneously displaying messages from others of the electronic mail accounts, and as a result of the determination, displaying, within the instantiation of the electronic mail application, a hostname of a first remote electronic mail server system providing the first one of the electronic mail accounts without displaying an account name of the first one of the electronic mail accounts. The method further includes receiving, from a user of the client computing device, a request to view messages from a second one of the electronic mail accounts that is different from the first one of the electronic mail accounts. The method further includes displaying in the instantiation of the electronic mail application, messages from the second one of the electronic mail accounts without simultaneously displaying messages from others of the electronic mail accounts, and as a result of the determination, displaying, within the instantiation of the electronic mail application, a hostname of a second remote electronic mail server system providing the second one of the electronic mail accounts without displaying an account name of the second one of the electronic mail accounts.

Implementations can include any, all, or none of the following features. The method can include automatically accessing authentication information for the second one of the electronic mail accounts, in response to the user request, and providing the authentication information to a remote electronic mail server. The method can include prior to receiving the user request, automatically accessing authentication information for the second one of the electronic mail accounts, providing the authentication information to a remote electronic mail server, and automatically accessing additional messages from the second one of the electronic mail accounts while the messages from the second one of the electronic mail accounts are not presently displayed on the client computing device. The method can include while displaying the messages from the second one of the electronic mail accounts, storing data for a subset of the messages from the first one of the electronic mail accounts in a volatile memory. The method can include while the client computing device is displaying the messages from the second one of the electronic mail accounts, accessing additional messages from the first one of the electronic mail accounts and updating the volatile memory with the additional messages from the first one of the electronic mail accounts. The displayed messages from the first one of the electronic mail accounts and the displayed messages from the second one of the electronic mail accounts can include message header information. The method can include displaying a menu that lists identifiers for the plurality of electronic mail accounts available on the client computing device, and receiving on the menu the user request to view messages from the second one of the electronic mail accounts.

In a second aspect, a computer-implemented electronic mail management method includes storing, on a client computing device, messages for a plurality of electronic mail accounts. Messages for each account are stored separately from messages for others of the plurality of electronic mail accounts. The method further includes determining that the electronic mail accounts are hosted by a single remote electronic mail server system having a single hostname. The method further includes displaying, within an instantiation of an electronic mail application, messages from a first one of the electronic mail accounts without simultaneously displaying messages from electronic mail accounts other than the first one of the electronic mail accounts and as a result of the determination, displaying, within the instantiation of the electronic mail application, an account name of the first one of the electronic mail accounts without displaying the single hostname of the single remote electronic mail server system. The method further includes receiving, from a user of the client computing device, a request to view messages from a second one of the electronic mail accounts that is different from the first one of the electronic mail accounts. The method further includes displaying in the instantiation of the electronic mail application, messages from the second one of the electronic mail accounts without simultaneously displaying messages from electronic mail accounts other than the second one of the electronic mail accounts and as a result of the determination, displaying, within the instantiation of the electronic mail application, an account name of the second one of the electronic mail accounts without displaying the single hostname of the single remote electronic mail server system.

In a third aspect, a computer-implemented electronic mail management system includes a persistent storage storing messages for a plurality of electronic mail accounts provided by a plurality of remote electronic mail server systems. Messages for each of the plurality of electronic mail accounts are stored separately from messages for others of the plurality of electronic mail accounts. The system further includes an electronic mail application that includes an electronic mail presentation manager programmed to display messages from only one of the plurality of electronic mail accounts at a time, determine that the remote electronic mail server systems each have a different hostname than the others of the remote electronic mail server systems, and, as a result of the determination, display a hostname of a remote electronic mail server system providing the one of the electronic mail accounts without displaying an account name of the one of the electronic mail accounts. The electronic mail application further includes an electronic mail account manager configured to provide to the electronic mail presentation manager information from messages in a first of the electronic mail accounts at one time and to switch to a second of the electronic mail accounts within a single instantiation of the electronic mail application.

Implementations can include any, all, or none of the following features. The system can include an account authentication module programmed to access authentication information, stored in the persistent storage, for the plurality of electronic mail accounts, and to provide the authentication information automatically to the remote electronic mail server systems so as to perform automatic fetching of the messages for the plurality of electronic mail accounts. The system can include an electronic mail fetcher configured to automatically gather additional messages periodically from the remote electronic mail server systems for the plurality of electronic mail accounts. The system can include a volatile memory in which the electronic mail application is programmed to maintain information about a sub-set of messages from the persistent storage for the first of the electronic mail accounts, while the electronic mail presentation manager is displaying messages from the second of the electronic mail accounts. The electronic mail application can be programmed to replace the sub-set of the messages from the first of the electronic mail accounts in the persistent storage with newly downloaded messages in the background while the electronic mail presentation manager is displaying the messages from the second of the electronic mail accounts. The electronic mail presentation manager and electronic mail account manager can be programmed to, upon receiving a user request to switch from the second of the electronic mail accounts to the first of the electronic mail accounts, retrieve from the volatile memory the sub-set of the messages from the first of the electronic mail accounts, display the sub-set of the messages from the first of the electronic mail accounts, and store a sub-set of the messages from the second of the electronic mail accounts in the volatile memory. The displayed messages from the first of the electronic mail accounts and the messages from the second of the electronic mail accounts data can include message header information from the messages.

The systems and techniques described here may provide one or more of the following advantages in certain implementations. For example, a system can provide for managing multiple messaging accounts within a single mobile messaging application. Also, a system can provide for efficient, easy, and quick switching between multiple messaging accounts within a single mobile messaging application. In addition, a system can provide for efficient use of memory resources when accessing multiple messaging accounts within a single mobile messaging application. A system can provide for efficient use of display space by intelligently truncating account names rather than simply removing characters from the end of the account name. Certain systems can also provide separate inboxes for multiple messaging accounts within a single mobile messaging application, and can display the messages from the accounts without mixing them so that a user can keep their accounts apart conceptually while still being able to move between the accounts easily. Finally, a system can, in certain implementations, provide for persistent authentication to multiple messaging accounts within a single mobile messaging application.

The details of one or more embodiments of the multi-account messaging management features are set forth in the accompanying drawings and the description below. Other features and advantages of the multi-account messaging management features will be apparent from the description and drawings, and from the claims.

DESCRIPTION OF DRAWINGS

Like reference symbols in the various drawings indicate like elements.

DETAILED DESCRIPTION

This document describes systems and techniques for multi-account messaging management. In general, messages or message information (e.g., headers for messages) are displayed separately for each account for a user, and the user can transition from viewing one account to viewing another account simply by selecting the other account. Upon such a selection, the user's device may automatically access the second account, including by submitting authentication information for the user to a server for the second account, and may display only messages for that second account. In such a manner, a user can keep his or her accounts separate conceptually, but can quickly transition between the accounts.

Figure 1:
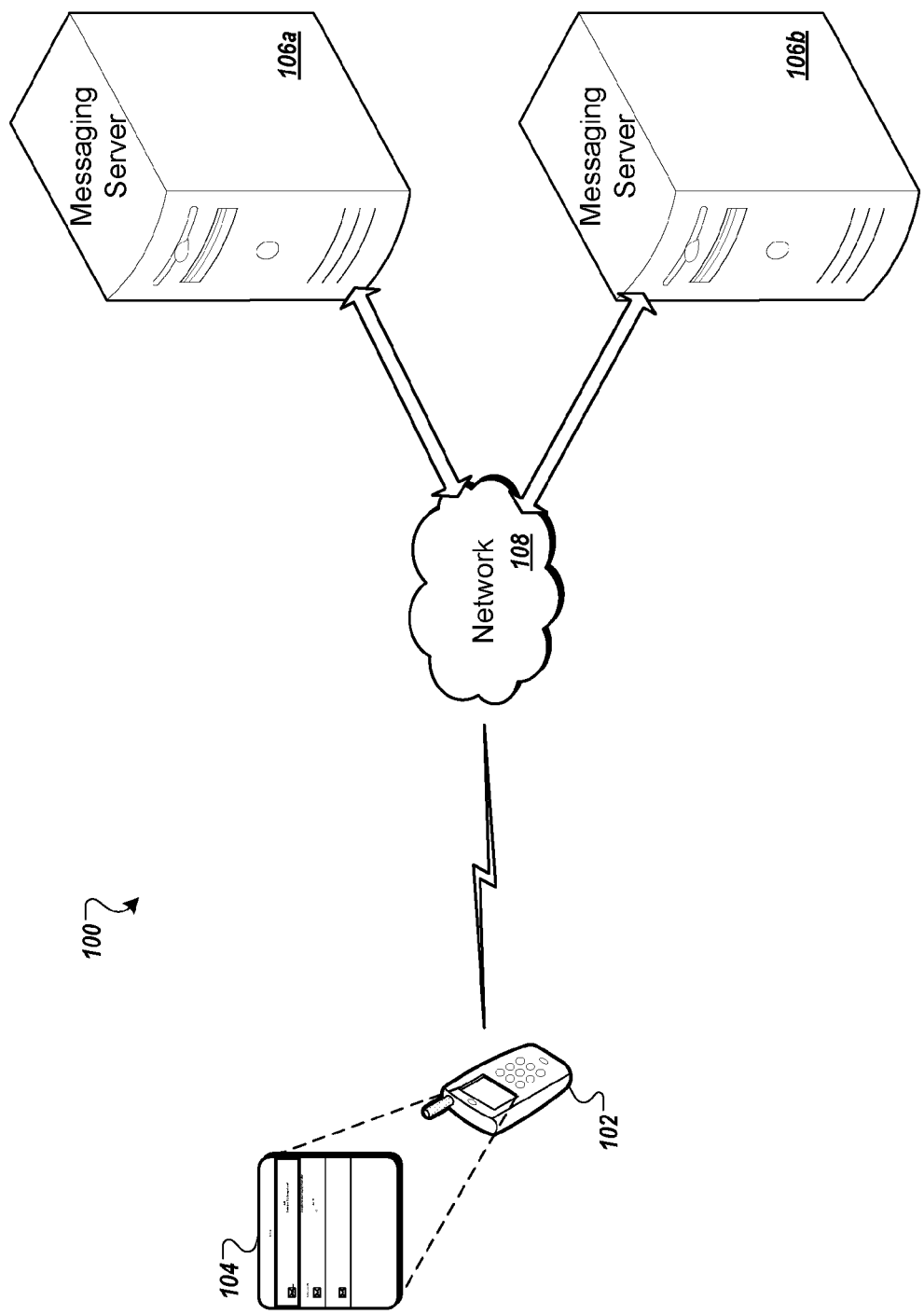
FIG. 1 is a schematic diagram showing an example of a system for multi-account messaging management.

FIG. 1 is a schematic diagram showing an example of a system 100 for multi-account messaging management. The system 100 allows a user of a mobile computing device 102 to manage messages from multiple messaging accounts within a mobile messaging application 104. The mobile messaging application 104 receives messages from one or more messaging servers 106a-b. In addition, the mobile messaging application 104 can access multiple accounts at each of the messaging servers 106a-b. The mobile computing device 102 and the messaging server 106a-b are in communication over one or more networks 108, such as a wireless telephone network or other wireless network and the Internet.

The messaging servers 106a-b send messages to and receive messages from client devices, such as the mobile computing device 102 and other mobile or non-mobile devices. In some implementations, the messaging servers 106a-b send and receive messages using one or more electronic mail protocols, such as Simple Mail Transfer Protocol (SMTP), Internet Message Access Protocol (IMAP), and/or Post Office Protocol (POP). In some implementations, the messaging servers 106a-b send and receive messages using one or more other messaging protocols, such as instant messaging or text messaging. Messages can include, for example, electronic mail (email), instant messages, Short Message Service (SMS) text messages, and/or Multimedia Message Service (MMS) messages. In the example shown here, the messaging server 106a hosts a "kbo.example.com" messaging system and the messaging server 106b hosts a "sol.example.org" messaging system.

The mobile messaging application 104 can retrieve messages from one or more of the messaging servers 106a-b using a pull or polling method. For example, the mobile messaging application 104 can periodically send a request to a messaging server for additional messages. In addition, one or more of the messaging servers 106a-b can send messages to the mobile messaging application 104 using a push or event based method. For example, a messaging server can send new messages to the mobile messaging application 104 as the new messages arrive at the messaging server. The system may also used an induced pull method that looks to the user like a push technique, where the messaging servers 106a-b notify the mobile messaging application 104 when new messages have arrived, thus causing the mobile messaging application 104 to pull down the messages.

In some implementations, an operating system provided by the mobile computing device 102 limits the number of active applications. For example, the number of active applications may be limited to a single application. The mobile messaging application 104 allows a user to access multiple messaging accounts from a single application. In some implementations, the mobile messaging application 104 can be a Java application. In some implementations, the mobile computing device 102 has limited resources, such as a small amount of memory, storage space, or number of central processing unit (CPU) clock cycles. The mobile messaging application 104 can conserve memory use, storage space, and/or CPU clock cycles by processing messages from each of the multiple messaging accounts within a single instance of the mobile messaging application 104.

Figure 2A:
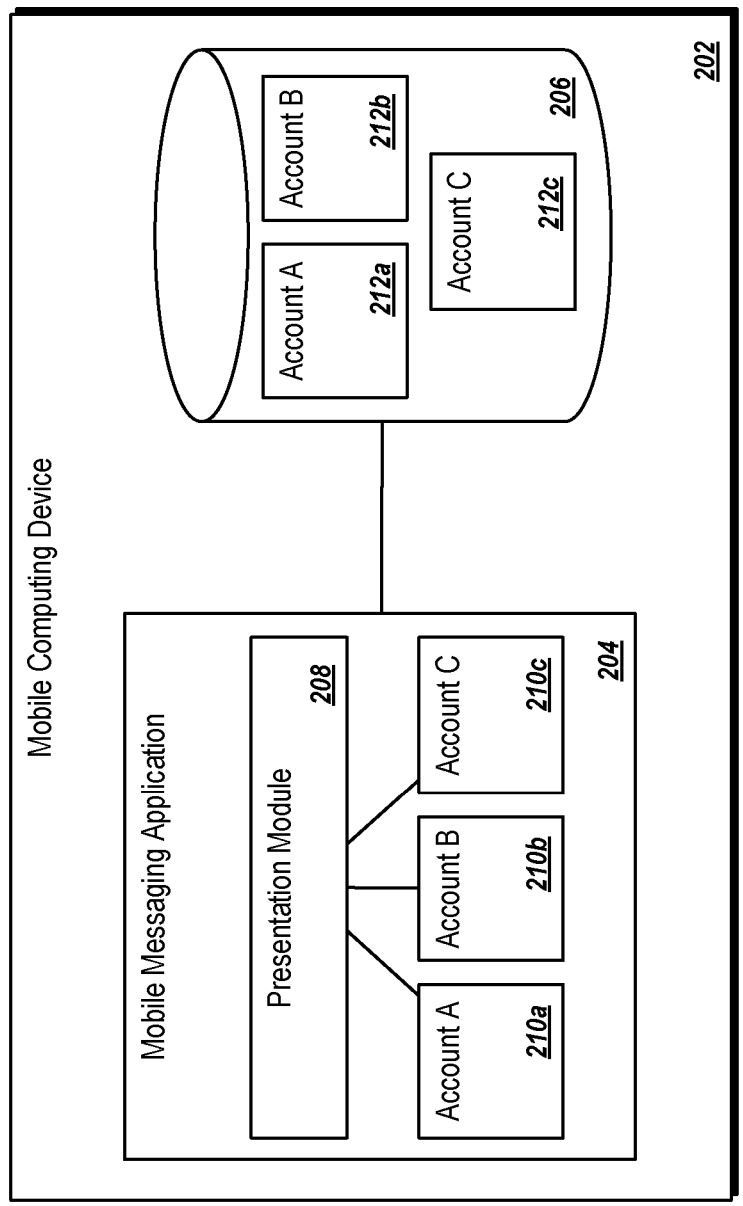
FIG. 2A is a block diagram showing an example of a mobile computing device for multi-account messaging management.

FIG. 2A is a block diagram showing an example of a mobile computing device 202 for multi-account messaging management. The mobile computing device 202 includes a mobile messaging application 204 and a data storage 206. The mobile messaging application 204 allows a user to manage messages from multiple messaging accounts using a single messaging application. The mobile messaging application 204 includes a presentation module 208 that generates user interfaces for presentation to the user of the mobile computing device 202.

The presentation module 208 may control which messages are presented to a user and the manner in which they are presented. For example, the presentation module 208 may first identify an account to be displayed, and may then identify the ten most recent messages received into that account. The presentation module 208 may cause information about those messages to be retrieved so that subject lines and sender identifiers may be displayed for each of the messages. The presentation manager may also selected other messages for display, such as when a user chooses to sort messages in a manner other than the reverse chronological order of their receipt.

The presentation module 208 separately presents multiple user interfaces 210a-c for each account that the user manages within the mobile messaging application 204. Each of the user interfaces 210a-c may result in generating the same user display elements on the device, but with message information provided from different accounts for a user. In this manner, the user can have similar experiences when interacting with each account, but may have each account visually separated from other accounts.

The user interfaces 210a-c include an account A interface, an account B interface, and an account C interface, respectively. The accounts can be hosted at one or more of the messaging servers 106a-b. For example, in the case of email accounts, account A may be an "eris@kbo.example.com" account hosted at the messaging server 106a, account B may be a "makemake@kbo.example.com" account hosted at the messaging server 106a, and account C may be a "jupiter@sol.example.org" account hosted at the messaging server 106b.

The mobile messaging application 204 manages account information for the messaging accounts, such as authentication information and message information. For example, the mobile messaging application 204 separately stores messages for the accounts A, B, and C in multiple storage locations 212a-c, respectively. Such separate storage may include separate storage both in volatile (e.g., RAM) and in persistent memory. Storing messages separately allows the mobile messaging application 204 to present messages to the user faster than if the mobile messaging application 204 were to filter a single list of messages when presenting messages for a particular one of the user interfaces 210a-c. When the presentation module 208 presents a user interface, such as the user interface 210a for account A, the presentation module 208 retrieves the messages for account A from the storage location 212a. Also, storage on a per-account basis permits the presentation module 208 to handle a smaller message volume at any one time.

In some implementations, storing messages separately allows the mobile messaging application 204 to minimize the effects of data corruption when processing messages from an account. For example, if an error occurs while processing messages for a first account, messages from a second account may remain unaffected. In some implementations, storing messages separately allows the mobile messaging application 204 to easily perform operations on a set of messages for an entire account, such as deleting messages from an account when a user signs out or removes the account.

In some implementations, the presentation module 208 retrieves the messages from the storage location 212a each time the user interface 210a for account A is presented. In some implementations, the presentation module 208 retains the messages (or a sub-set of all the messages, such as the top X messages) in a volatile memory when switching between user interfaces such that a subsequent display of the user interface 210a does not cause the messages to have to be retrieved from the storage location 212a again. For example, the mobile messaging application 204 can store the messages for account A in a random access memory (RAM) when switching to another account and retrieve the messages from the RAM upon returning to account A. Alternatively, a particular number or messages may be stored for each label, category, or folder of messages. In another example, a particular number of the newest messages can be stored.

The mobile messaging application 204 stores account authentication information for each of the accounts A, B, and C in the data storage 206. This allows the user to input account authentication information for each of the accounts A, B, and C once. The mobile messaging application 204 stores the account authentication information in the data storage 206 and uses the account authentication information as needed to access messages from the messaging servers 106a-b. In some implementations, the data storage 206 is a persistent storage. For example, when the mobile computing device 202 is powered off and back on again, the data storage 206 retains information stored within the data storage 206 prior to the mobile computing device 202 being powered off.

Figure 2B:
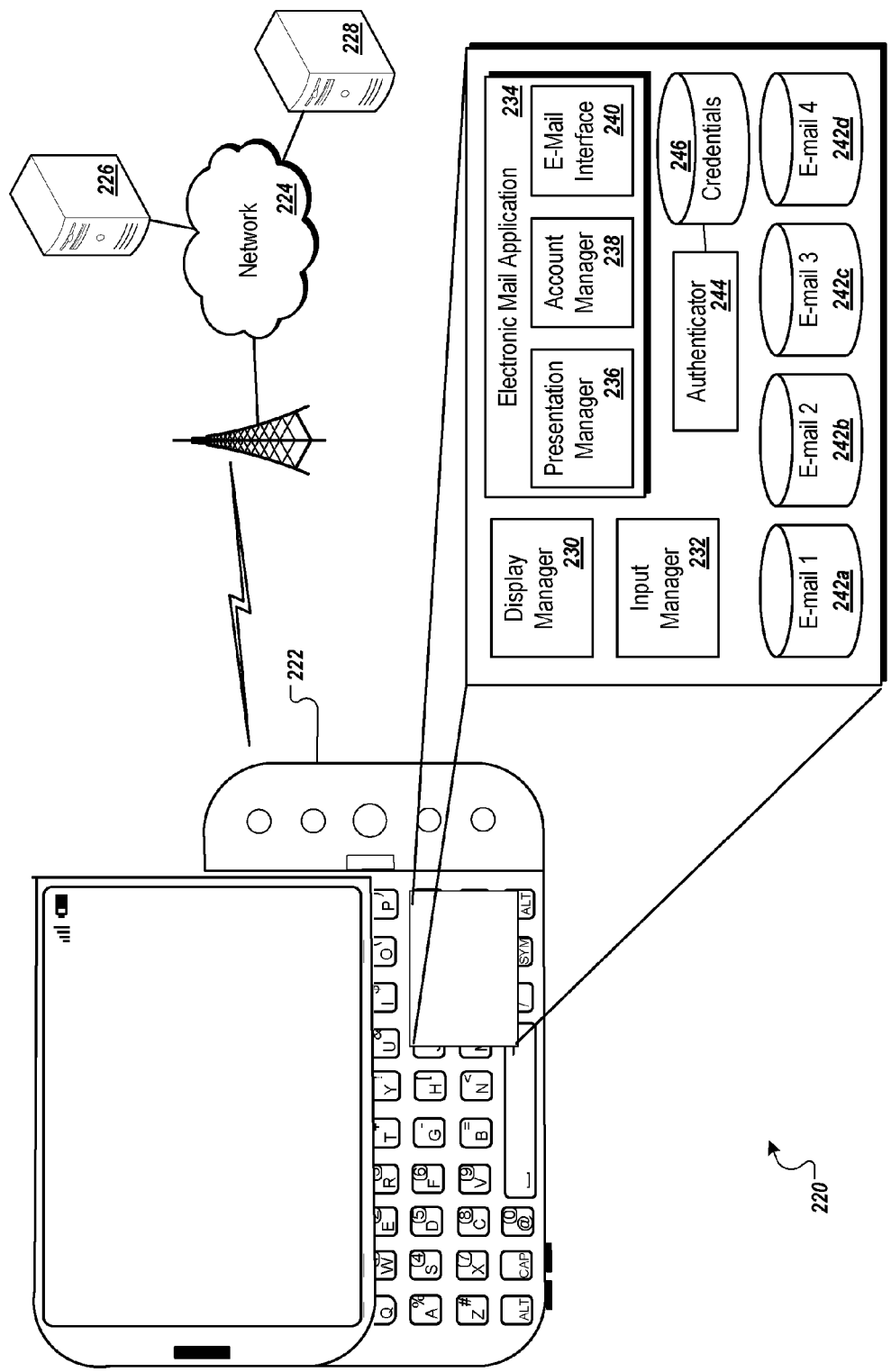
FIG. 2B is a schematic diagram of a system for managing and delivering multi-account messaging to mobile devices.

FIG. 2B is a schematic diagram of a system 220 for managing and delivering multi-account messaging to mobile devices. The system 220 includes a mobile device 222 that is similar to the mobile computing device 202 in FIG. 2A. The mobile device 222 can receive and send messages, including electronic mail messages via a network 224, which may include the Internet, and one or more electronic mail servers 226, 228.

The electronic mail servers 226, 228 may include servers from multiple service providers (e.g., providers having different domains from each other), and the user of the mobile device 222 can have accounts with each such provider. In addition, a user may have multiple accounts with a single provider, such as a personal account and a work account. In such a situation, the techniques described here can assist a user in better segmenting their use of electronic mail for personal reasons from their use for work reasons. Such segmentation may assist the user in better complying with corporate limitations on electronic mail usage, while the user may still use a single instance of an electronic mail client application. In addition, such use may enable the user to better maintain their personal usage separate and thus maintain claims for privacy over the use of their personal electronic mail account.

Various components in the mobile device 222 may cooperate with the electronic mail servers 226, 228 in order to permit a user to review message from multiple electronic mail accounts in a single program instance, and thus to switch easily and completely from one account to another. For example, a display manager 230 may be responsible for rendering content for presentation on the mobile device 222. The display manager 230 may receive graphic-related content from a number of sources and may determine how the content is to be provided to a user. For example, a number of different windows for various applications on the mobile device 222 may need to be displayed, and the display manager 230 may determine which to display, which to hide, and what to display or hide when there is overlap between various graphical objects.

An input manager 232 may be responsible for translating commands provided by a user of the mobile device 222. For example, such commands may come from a keyboard, from a touch screen display, from a trackball, or from other such sources, including dedicated buttons or soft buttons (e.g., buttons whose functions may change over time, and whose functions may be displayed on areas of a display that are adjacent to the particular buttons). The input manager 232 may determine, for example, in what area of the display commands are being received, and thus for which application being shown on the display the commands are intended. In addition, it may interpret input motions on a touch screen into a common format and pass those interpreted motions (e.g., short press, long press, multiple press, and straight-line drags) to the appropriate application. The input manager 232 may also report such inputs to an event manager (not shown) that in turn reports them to the appropriate modules or applications.

A variety of applications may operate, generally on a common microprocessor, on the mobile device 222. The applications may take a variety of forms, such as mapping applications, e-mail and other messaging applications, web browser applications, and various applications running within a web browser or running extensions of a web browser.

In this example, the display manager 230 and the input manager 232 interact with an electronic mail application 234, which may be one of multiple applications loaded on the mobile device 222. In certain situations, the mobile device 222 may be capable of operating only one application at a time. As a result, it may be difficult and time consuming to switch from one application to another or to launch a new instance of an application. As a result, the electronic mail application 234 may include an account manager 238 that is programmed to select messages from one particular account to display at one time, without requiring extensive actions by a user and without having to open a new instance of the electronic mail application 234.

The account manager may respond, for instance, to a user's selection of an electronic mail account on a drop down or pop up menu and may cause the messages with a previously selected account to disappear, and messages associated with the newly selected account to be displayed. The display of the messages may be managed by a presentation manager, which may take a familiar form for an electronic mail application. For instance, the presentation manager may show message subject lines in an in box for a particular account, and may also show various folders into which a user may have moved messages. The account manager 238 may retrieve messages from a plurality of electronic mail files 242a-d using an electronic mail interface 240. In some implementations, the messages are stored within a database. For example, messages for a first account can be stored in a first table within the database and messages for a second account can be stored in a second table within the database that is separate from the first table.

The interface may reformat electronic mail message information as appropriate, where different accounts format their information in various manners. Thus, for instance, when a user selects another account to review, the account manager may notify the electronic mail interface 240 with an identifier for the other account, and the electronic mail interface 240 may retrieve the appropriate cached electronic mail messages and/or header information from the appropriate electronic mail file among the electronic mail files 242a-d.

In addition, the electronic mail interface 240 may also control the sending and receipt of electronic mail messages in the background as a user is reviewing mail messages. In such a situation, a presentation manager 236 may provide abbreviated notices regarding the status of accounts that the user is not currently reviewing. For instance, a menu for switching between accounts may include a number after the name of each account to represent the number of un-read or new messages in the other account. In such a manner, the user can determine whether there may be a need to switch to another account without actually needing to make the switch.

The electronic mail interface 240 may also permit for searching across multiple accounts, both on messages stored on the mobile device 222 and for messages at the electronic mail servers 226, 228. Thus, for example, a user can enter a search term in an account that is currently active, and the search term can be applied to other accounts. The number of matches in each account may be display in the pop up menu in a manner like that described above, and header information may be displayed for matching messages across accounts, in certain implementations. The search results may also be segmented by account so as to prevent unwanted mixing of account information.

For various background activities, which happen automatically generally without the user knowing about them, authentication information such as user ID's and passwords may need to be stored by the mobile device 222, such as in a credentials storage 246. In some implementations, the user ID includes an email address. An authenticator 244 may maintain security over such credentials so that other applications on the mobile device 222 may not access them, and so that a password may be required to access the electronic mail application 234 before messages may be retrieved automatically using the authenticator 244 and the credentials storage 246. Thus, for example, once the electronic mail application 234 has launched (perhaps with a user password provided), the electronic mail interface 240 may seek to pull e-mails (or may receive a message from a server that new messages have arrived) periodically, and may thus seek user credentials from the authenticator when the electronic mail servers 226, 228 seek such credentials. In some implementations, the credentials storage 246 includes an authentication token resulting from a successful login with a user ID/email address and a password. The authenticator 244 then uses the authentication token for subsequent access to the e-mails.

Figure 3A:
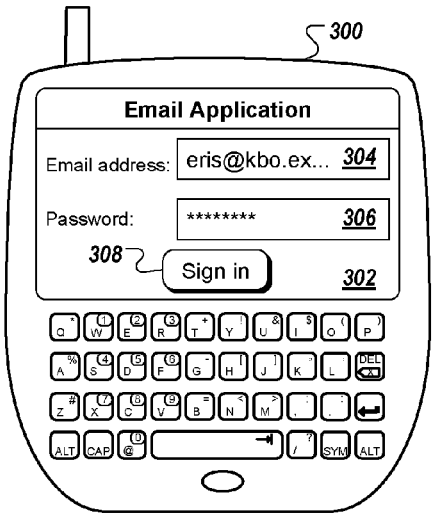
FIGS. 3A-3E show examples of a mobile computing device and user interfaces for use in multi-account messaging management.

FIG. 3A shows an example of a mobile computing device 300 for use in multi-account messaging management. The mobile computing device 300 includes a graphical user interface (GUI) 302 for adding a messaging account to be managed. A mobile messaging application, such as the mobile messaging application 104 or the mobile messaging application 204, can generate the GUI 302. The mobile computing device 300 can also include other user interfaces, such as a speaker, microphone, or user input controls.

The GUI 302 presents a user interface for inputting account authentication information. In this example, the mobile messaging application is a mobile email application. The GUI 302 includes an email address input field 304 and a password input field 306. The user has entered an "eris@kbo.example.com" email address in the email address input field 304 and a masked password in the password input field 306. The user can select a sign in control 308 to submit the authentication information to the mobile messaging application. Alternatively, upon entering both an email address in the email address input field 304 and a password in the password input field 306, the authentication information can be submitted to the mobile messaging application.

Upon receiving the authentication information, the mobile messaging application stores the authentication information, for example, in the data storage 206. The mobile messaging application uses the received authentication information to connect to the messaging server associated with the "eris@kbo.example.com" messaging account. For example, the mobile messaging application can check for email that has been sent to the "eris@kbo.example.com" account. In addition, the mobile messaging application can generate a GUI for presenting messages retrieved from the "eris@kbo.example.com" account.

Figure 3B:
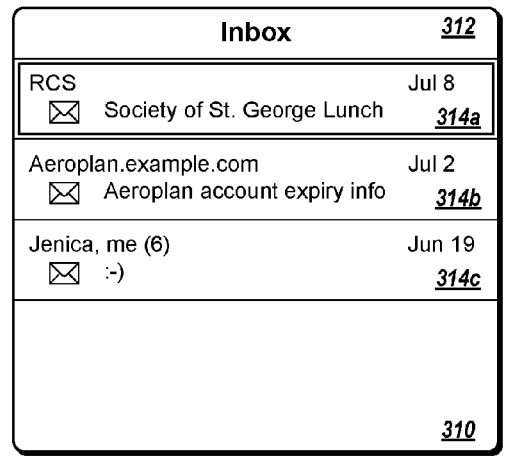

FIG. 3B shows an example of a GUI 310 for presenting and managing messages from an account. In particular, the GUI 310 presents messages retrieved from the "eris@kbo.example.com" account at the messaging server 106a. The GUI 310 includes a title bar 312. The title bar 312 indicates that the GUI 310 is an email inbox for the "eris@kbo.example.com" account. The GUI 310 also includes multiple email messages 314a-c. The email messages 314a-c can each include the time and/or date the email was received, an identifier of the sender (e.g., account name, server name, real name, or nickname), an indication of whether the email is read or unread, a subject of the email, and an indication of the number of emails in an email thread (e.g., "(6)"). The user can select an email to open and read the email or perform other management tasks, such as deleting the email, forwarding the email, moving the email, and/or tagging the email. In some implementations, email management and navigation options can be presented to the user in a pop-up menu.

Figure 3C:
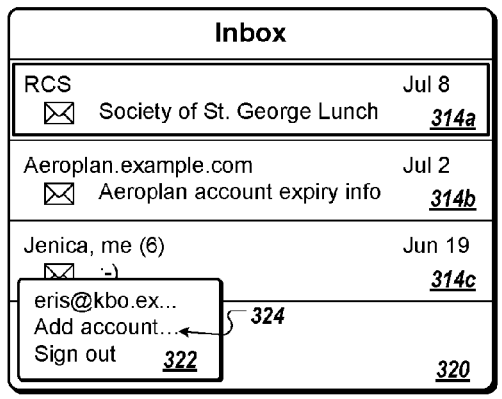

FIG. 3C shows an example of a GUI 320 for adding an account to a multi-account messaging management application. The GUI 320 includes a pop-up menu 322. The user can initiate the pop-up menu 322, for example, by selecting a menu control within a user input interface, such as a menu key on a keyboard or a menu button. The pop-up menu 322 includes an add account option 324. The user can select the add account option 324 to return to the GUI 302 where the user can input additional authentication information for another email account. For example, the user can input authentication information for a "jupiter@sol.example.org" account. The mobile messaging application retains the previous authentication information for the "eris@kbo.example.com" account.

Figure 3D:
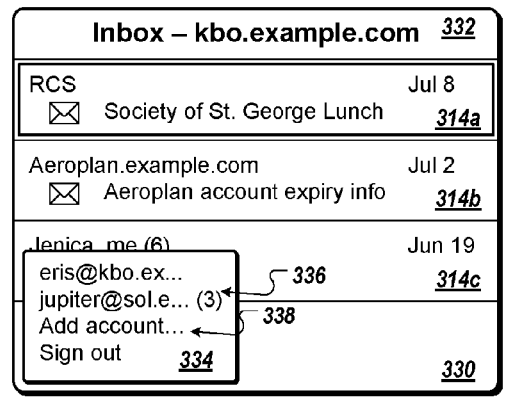

FIG. 3D shows an example of a GUI 330 for managing messages from accounts at multiple remote email servers. The GUI 330 includes a title bar 332. The title bar 332 now indicates that the GUI 330 is an email inbox for the account at the "kbo.example.com" remote email server as opposed to email from the "sol.example.org" remote email server. In some implementations, the display device of the mobile computing device 300 provides a limited area for font sizes that are easily readable. Contracting the length of the account identifier displayed in the title bar using the previously described rules can reduce the amount of space the title bar occupies while maintaining clarity regarding what account is being presented. For example, where the remote email servers have different hostnames, the GUI 330 can display the hostnames of the remote email servers without displaying the account names (e.g., the portion of the email address before the "@" symbol). In some implementations, the hostname is only used alone when there is not more than one email account at any particular email server hostname (e.g., all of the hostnames are different from one another).

In some implementations, another account identifier can be presented, such as a short account nickname. For example, the user can provide an account nickname in an input field on the GUI 302 and/or the mobile messaging application can retrieve an account nickname from the email server hosting the account.

The GUI 330 also includes a pop-up menu 334. The pop-up menu 334 includes a "jupiter@sol.example.org" option 336. The "jupiter@sol.example.org" option 336 indicates that there are three unread messages in the "jupiter@sol.example.org" account inbox. The user can select the "jupiter@sol.example.org" option 336 to go to the inbox for the "jupiter@sol.example.org" account. In some implementations, the mobile messaging application retrieves email from a remote server hosting the "jupiter@sol.example.org" account in the background while the "eris@kbo.example.com" account inbox is displayed.

The pop-up menu 334 also includes an add account option 338. The user can select the add account option 338 to return to the GUI 302 and input authentication information for another email account. For example, the user can input authentication information for a "makemake@kbo.example.com" account.

Figure 3E:
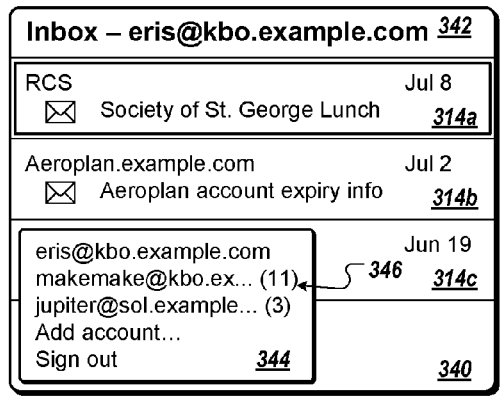

FIG. 3E shows an example of a GUI 340 for managing messages from multiple accounts at a remote email server. The GUI 340 includes a title bar 342. The title bar 342 indicates that the GUI 340 is an email inbox for the "eris@kbo.example.com" account as opposed to the "makemake" account at the same "kbo.example.com" server or the account at the "sol.example.org" server. In some implementations, if the mobile messaging application determines that the accounts are all from the same email server (e.g., "kbo.example.com"), then the mobile messaging application only displays the account names (e.g., "eris" or "makemake") in the title bar of the GUI 340 without displaying the hostnames of the remote email servers. In another example, the mobile messaging application can show a name other than the account name that is associated with the account, such as an account nickname.

The GUI 340 includes a pop-up menu 344. The pop-up menu 344 now includes a "makemake@kbo.example.com" option 346. The "makemake@kbo.example.com" option 346 indicates that there are eleven unread messages in the "makemake@kbo.example.com" account inbox. The user can go to the "makemake@kbo.example.com" account inbox by selecting the "makemake@kbo.example.com" option 346.

When the user selects a new account for display such as the "makemake@kbo.example.com" account, the mobile messaging application stores the currently displayed messages (e.g., the email messages 314a-c) in a volatile memory. If the "makemake@kbo.example.com" account has previously been displayed, then the mobile messaging application retrieves the "makemake@kbo.example.com" account emails from the volatile memory. Otherwise, the mobile messaging application retrieves the "makemake@kbo.example.com" account emails from a persistent memory. The mobile messaging application presents the "makemake@kbo.example.com" account emails to the user and updates the title bar to reflect the currently displayed account.

Figure 4:
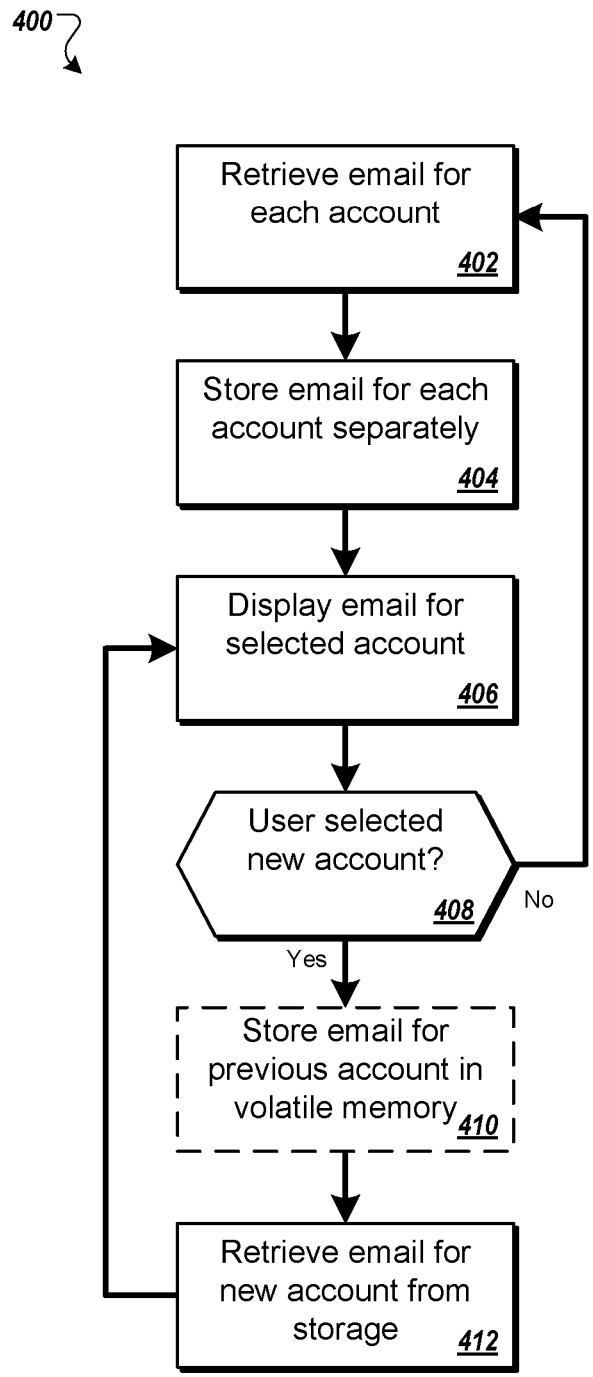
FIG. 4 is a flow chart showing an example of a process for multi-account messaging management.

FIG. 4 is a flow chart showing an example of a process 400 for multi-account messaging management. The process 400 may be performed, for example, by systems and devices as the system 100, the mobile computing device 202, and the mobile computing device 300. For clarity of presentation, the description that follows uses the system 100, the mobile computing device 202, and the mobile computing device 300 as the basis of examples for describing the process 400. However, another system, or combination of systems, may be used to perform the process 400.

The process 400 begins with retrieving (402) email for multiple email accounts from one or more remote email servers. For example, the mobile messaging application 104 retrieves messages from the messaging servers 106a-b for the "eris@kbo.example.com," "makemake@kbo.example.com," and "jupiter@sol.example.org" accounts.

The process 400 stores (404) the email for each email account in one or more files at a client computing device that are separate from files stored at the client computing device for email from the other email accounts. For example, the mobile messaging application 204 stores messages for the "eris@kbo.example.com" account in the storage location 212a, messages for the "makemake@kbo.example.com" account in the storage location 212b, and messages for the "jupiter@sol.example.org" account in the storage location 212c.

The process 400 displays (406) email for a selected email account without displaying email from other email accounts. For example, the mobile messaging application 104 and/or the mobile messaging application 204 can provide the retrieved emails for the "eris@kbo.example.com" account to the presentation module 208. The presentation module 208 can present the emails using the GUI 310, the GUI 330, and/or the GUI 340. The GUI 310, the GUI 330, and the GUI 340 show only emails for the "eris@kbo.example.com" account. The GUI 310, the GUI 330, and the GUI 340 do not show emails from the "makemake@kbo.example.com" account or the "jupiter@sol.example.org" account.

If the process 400 does not receive (408) a user input selecting a new email account for display, then the process 400 retrieves (402), stores (404), and displays (406) email again. For example, while displaying email for the "eris@kbo.example.com" account, the mobile messaging application 204 can continue to retrieve emails in the background for any or all of the accounts at the messaging servers 106a-b. The mobile messaging application 204 stores the emails in the data storage 206. The mobile messaging application 204 provides email updates to the presentation module 208 for the currently displayed "eris@kbo.example.com" account.

If the process 400 does receive (408) a user input selecting a new email account for display, then optionally the process 400 stores (410) email for the previous email account in a volatile memory. For example, upon receiving an input directing the mobile messaging application 204 to display email from the "makemake@kbo.example.com" account, the mobile messaging application 204 can store the email messages 314a-c from the "eris@kbo.example.com" account in a volatile memory. In some implementations, the user input can be a single operation, such as a hot key or combination of hot keys, such as by pressing the "shift" key and the "j" key together to move forward through the email accounts or the "shift" key and the "k" key together to move backward through the accounts. The mobile messaging application 204 can default to displaying the inbox of the selected email account. In this way, the user can navigate to another email account and have messages from that account displayed by making a single user input. In some implementations, the mobile messaging application 204 can receive further inputs from the user requesting display of message folders other than the inbox of the selected account (e.g., sent items, deleted items, or a personal folder).

The process 400 retrieves (412) email for the new email account from storage and displays (406) the retrieved email for the newly selected email account. For example, if the "makemake@kbo.example.com" account has previously been displayed, then the mobile messaging application 204 can retrieve emails for the "makemake@kbo.example.com" account from the volatile memory. Otherwise, the mobile messaging application 204 retrieves emails for the "makemake@kbo.example.com" account from the storage location 212b. The mobile messaging application 204 provides the retrieved emails for the "makemake@kbo.example.com" account to the presentation module 208. The presentation module 208 presents the emails to the user in a GUI and updates the title bar of the GUI to reflect the newly displayed "makemake@kbo.example.com" account.

Figure 5:
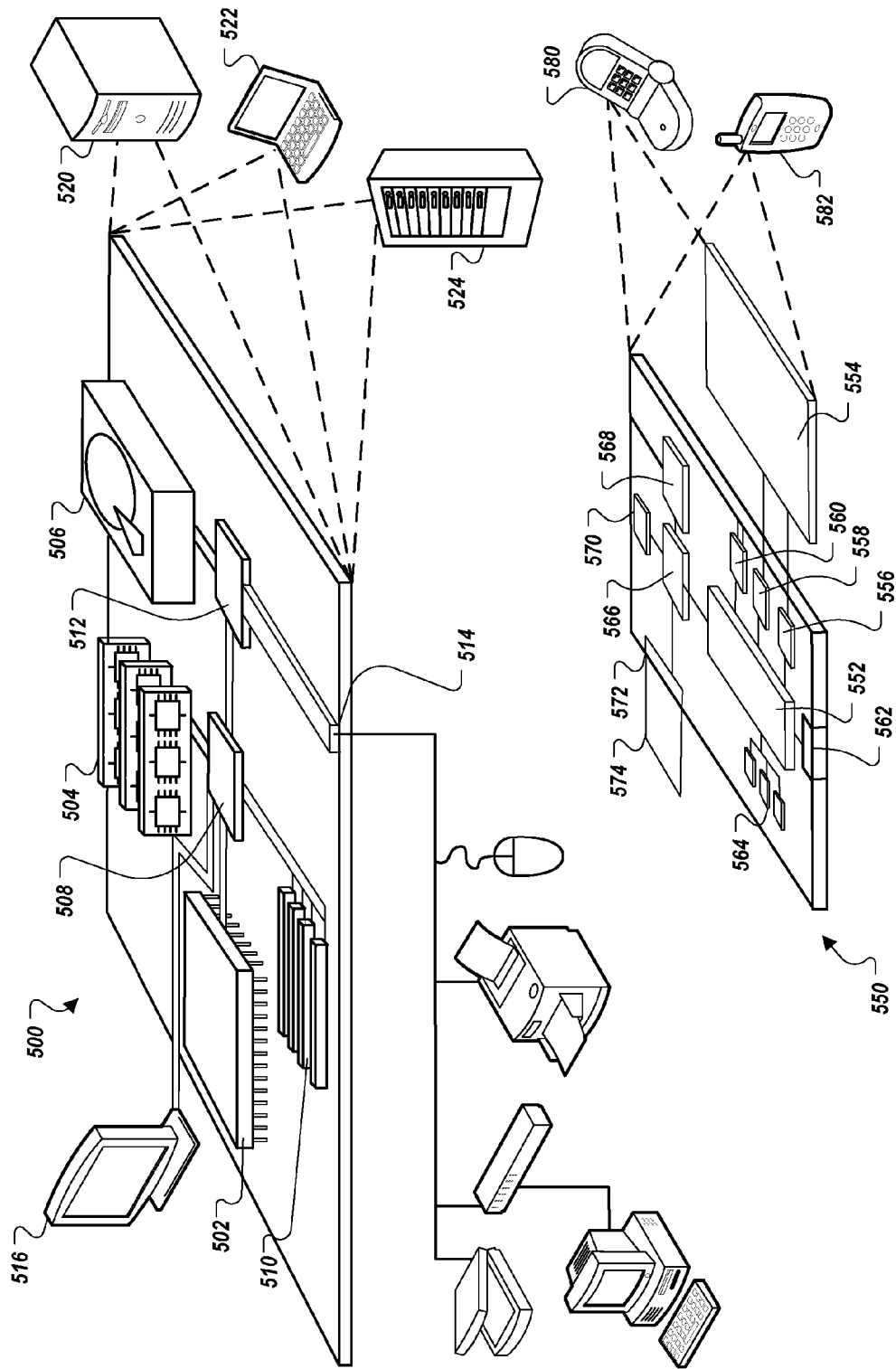
FIG. 5 shows an example of a computing device and a mobile computing device that can be used in connection with computer-implemented methods described in this document.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on the processor 502, or a propagated signal.

The high-speed interface 508 manages bandwidth-intensive operations for the computing device 500, while the low-speed interface 512 manages lower bandwidth-intensive operations. Such allocation of functions is exemplary only. In one implementation, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as the mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a microdrive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, the expansion memory 574, memory on the processor 552, or a propagated signal that may be received, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls, SMS, EMS, or MMS messaging, CDMA, TDMA, PDC, WCDMA, container document CDMA2000, or GPRS, among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    storing, at a client computing device, messages for a plurality of electronic mail accounts provided by a plurality of electronic mail server systems that are remote from the client computing device;
    displaying, within an instantiation of an electronic mail application, messages from a first electronic mail account of the plurality of electronic mail accounts without concurrently displaying messages from one or more other electronic mail accounts of the plurality of electronic mail accounts, wherein particular ones of the displayed messages include displayed text that has been provided by corresponding senders of the particular ones of the displayed messages;
    receiving, by the client computing device while the client computing device is displaying the messages from the first electronic mail account without concurrently displaying the messages from the one or more other electronic mail accounts, user input to display a menu;
    responsive to receiving the user input to display the menu, concurrently displaying (i) the messages from the first electronic mail account, and (ii) the menu, with one or more user-selectable options that identify the one or more other electronic mail accounts being included in the menu, wherein the display of the menu overlaps a display of at least one message of the messages from the first electronic mail account;
    receiving, by the client computing device while the client computing device is concurrently displaying the messages from the first electronic mail account and the menu, user selection from the menu of an option that identifies a second electronic mail account from among the one or more options that identify the one or more other electronic mail accounts, wherein the second electronic mail account is different from the first electronic mail account;
    responsive to receiving the user selection of the option that identifies the second electronic mail account, displaying, in the instantiation of the electronic mail application, messages from the second electronic mail account without concurrently displaying messages from the first electronic mail account;
    determining that each of the plurality of electronic mail accounts are hosted at a same electronic mail server system; and
    in response to determining that each of the plurality of electronic mail accounts are hosted at the same electronic mail server system, displaying a portion of an account identifier for the first electronic mail account by displaying an account name portion for the first electronic mail account without displaying a hostname for the first electronic mail account.

2. The method of claim 1, further comprising automatically accessing authentication information for the second electronic mail account, in response to the user selection of the option that identifies the second electronic mail account, and providing the authentication information to one of the plurality of electronic mail server systems.

3. The method of claim 1, further comprising, before receiving the user selection of the option that identifies the second electronic mail account, automatically accessing authentication information for the second electronic mail account, providing the authentication information to one of the plurality of electronic mail server systems, and automatically accessing additional messages from the second electronic mail account while the messages from the second electronic mail account are not presently displayed on the client computing device.

4. The method of claim 1, further comprising while displaying the messages from the second electronic mail account, storing data for a subset of the messages from the first electronic mail account in a volatile memory on the client computing device.

5. The method of claim 4, further comprising while the client computing device is displaying the messages from the second electronic mail account, accessing additional messages from the first electronic mail account and updating the volatile memory with the additional messages from the first electronic mail account.

6. The computer-implemented method of claim 1, wherein the display of the menu that overlaps the display of the at least one message further includes a display of a user-selectable option to add another electronic mail account; and
    further comprising receiving, by the client communication device, user selection of the option to add the another electronic mail account, and in response displaying a user interface for inputting electronic mail account authentication information.

7. The computer-implemented method of claim 6, wherein the electronic mail account authentication information includes a username and a password.

8. The computer-implemented method of claim 1, wherein the display of the menu that overlaps the display of the at least one message is a pop up menu.

9. The computer-implemented method of claim 1, wherein concurrently displaying the messages from the first electronic mail account and the menu includes displaying, in the menu, two or more user-selectable options that identify two or more of the plurality of electronic mail accounts.

10. The computer-implemented method of claim 1, wherein the display of the menu overlaps a display of an identifier of a sender of a particular message and a display of a subject of the particular message.

11. The computer-implemented method of claim 1, wherein the display of the menu further includes a display of a user-selectable option to sign out from the first electronic mail account.

12. The computer-implemented method of claim 1, wherein the display of the menu presents, in association with a user-selectable option for a particular electronic mail account of the one or more user-selectable options that identify the one or more other electronic mail accounts, a number that represents a number of unread or new messages for the particular electronic mail account.

13. The computer-implemented method of claim 1, further comprising:
    receiving, by the client computing device, a search term while the client computing device is displaying the messages from the first electronic mail account without concurrently displaying the messages from the one or more other electronic mail accounts;
    searching each of the one or more other electronic mail accounts using the received search term; and
    displaying, by the client computing device and in the display of the menu, an indication of a number of matches to the search query for each of the one or more other electronic mail accounts.

14. The computer-implemented method of claim 1, wherein the portion of the account identifier for the first electronic mail account is presented in a title bar of the instantiation of the electronic mail application.

15. A non-transitory computer-readable medium including instructions that, when executed by one or more processors, cause performance of operations that include:
- storing, at a client computing device, messages for a plurality of electronic mail accounts provided by a plurality of electronic mail server systems that are remote from the client computing device;
- displaying, within an instantiation of an electronic mail application, messages from a first electronic mail account of the plurality of electronic mail accounts without concurrently displaying messages from one or more other electronic mail accounts of the plurality of electronic mail accounts, wherein particular ones of the displayed messages include displayed text that has been provided by corresponding senders of the particular ones of the displayed messages;
- receiving, by the client computing device while the client computing device is displaying the messages from the first electronic mail account without concurrently displaying the messages from the one or more other electronic mail accounts, user input to display a menu;
- responsive to receiving the user input to display the menu, concurrently displaying (i) the messages from the first electronic mail account, and (ii) the menu, with one or more user-selectable options that identify the one or more other electronic mail accounts being included in the menu, wherein the display of the menu overlaps a display of at least one message of the messages from the first electronic mail account;
- receiving, by the client computing device while the client computing device is concurrently displaying the messages from the first electronic mail account and the menu, user selection from the menu of an option that identifies a second electronic mail account from among the one or more options that identify the one or more other electronic mail accounts, wherein the second electronic mail account is different from the first electronic mail account;
- responsive to receiving the user selection of the option that identifies the second electronic mail account, displaying, in the instantiation of the electronic mail application, messages from the second electronic mail account without concurrently displaying messages from the first electronic mail account;
- determining that each of the plurality of electronic mail accounts are hosted at different electronic mail server systems; and
- in response to determining that each of the plurality of electronic mail accounts are hosted at the same electronic mail server system, displaying a portion of an account identifier for the first electronic mail account by displaying an account name portion for the first electronic mail account without displaying a hostname for the first electronic mail account.

16. A computer-implemented method, comprising:
- storing, at a client computing device, messages for a plurality of electronic mail accounts provided by a plurality of electronic mail server systems that are remote from the client computing device;
- displaying, within an instantiation of an electronic mail application, messages from a first electronic mail account of the plurality of electronic mail accounts without concurrently displaying messages from one or more other electronic mail accounts of the plurality of electronic mail accounts, wherein particular ones of the displayed messages include displayed text that has been provided by corresponding senders of the particular ones of the displayed messages;
- receiving, by the client computing device while the client computing device is displaying the messages from the first electronic mail account without concurrently displaying the messages from the one or more other electronic mail accounts, user input to display a menu;
- responsive to receiving the user input to display the menu, concurrently displaying (i) the messages from the first electronic mail account, and (ii) the menu, with one or more user-selectable options that identify the one or more other electronic mail accounts being included in the menu, wherein the display of the menu overlaps a display of at least one message of the messages from the first electronic mail account;
- receiving, by the client computing device while the client computing device is concurrently displaying the messages from the first electronic mail account and the menu, user selection from the menu of an option that identifies a second electronic mail account from among the one or more options that identify the one or more other electronic mail accounts, wherein the second electronic mail account is different from the first electronic mail account;
- responsive to receiving the user selection of the option that identifies the second electronic mail account, displaying, in the instantiation of the electronic mail application, messages from the second electronic mail account without concurrently displaying messages from the first electronic mail account;
- determining that each of the plurality of electronic mail accounts are hosted at a same electronic mail server system; and
- in response to determining that each of the plurality of electronic mail accounts are hosted at different electronic mail server systems, displaying a portion of an account identifier for the first electronic mail account by displaying a hostname of the first electronic mail account without displaying an account name of the first electronic mail account.

17. The computer-implemented method of claim 16, wherein the portion of the account identifier from the first electronic mail account is presented in a title bar of the instantiation of the electronic mail application.

18. A non-transitory computer-readable medium including instructions that, when executed by one or more processors, cause performance of operations that include:
- storing, at a client computing device, messages for a plurality of electronic mail accounts provided by a plurality of electronic mail server systems that are remote from the client computing device;
- displaying, within an instantiation of an electronic mail application, messages from a first electronic mail account of the plurality of electronic mail accounts without concurrently displaying messages from one or more other electronic mail accounts of the plurality of electronic mail accounts, wherein particular ones of the displayed messages include displayed text that has been provided by corresponding senders of the particular ones of the displayed messages;
- receiving, by the client computing device while the client computing device is displaying the messages from the first electronic mail account without concurrently displaying the messages from the one or more other electronic mail accounts, user input to display a menu;

responsive to receiving the user input to display the menu, concurrently displaying (i) the messages from the first electronic mail account, and (ii) the menu, with one or more user-selectable options that identify the one or more other electronic mail accounts being included in the menu, wherein the display of the menu overlaps a display of at least one message of the messages from the first electronic mail account;

receiving, by the client computing device while the client computing device is concurrently displaying the messages from the first electronic mail account and the menu, user selection from the menu of an option that identifies a second electronic mail account from among the one or more options that identify the one or more other electronic mail accounts, wherein the second electronic mail account is different from the first electronic mail account;

responsive to receiving the user selection of the option that identifies the second electronic mail account, displaying, in the instantiation of the electronic mail application, messages from the second electronic mail account without concurrently displaying messages from the first electronic mail account;

determining that each of the plurality of electronic mail accounts are hosted at a same electronic mail server system; and in response to determining that each of the plurality of electronic mail accounts are hosted at different electronic mail server systems, displaying a portion of an account identifier for the first electronic mail account by displaying a hostname of the first electronic mail account without displaying an account name of the first electronic mail account.

* * * * *